United States Patent [19]

Naylor et al.

[11] 4,075,130
[45] Feb. 21, 1978

[54] POLYOXYPROPYLENE POLYAMINE DERIVATIVES AS DEFOAMERS

[75] Inventors: Carter G. Naylor; Ernest L. Yeakey, both of Austin, Tex.

[73] Assignee: Texaco Development Corporation, New York, N.Y.

[21] Appl. No.: 718,490

[22] Filed: Aug. 30, 1976

[51] Int. Cl.$^2$ .................... C11D 1/10; C11D 1/48; C11D 3/30

[52] U.S. Cl. .................... 252/548; 252/89 R; 252/135; 252/321; 252/358; 252/525; 252/529; 252/535; 252/539; 252/540; 252/544; 252/554; 252/558; 252/559

[58] Field of Search ................ 252/89, 135, 321, 358, 252/544, 548, DIG. 1; 260/584 B

[56] References Cited

U.S. PATENT DOCUMENTS

| | | | |
|---|---|---|---|
| 2,766,288 | 10/1956 | Erickson | 260/584 |
| 2,979,528 | 4/1961 | Lundsted | 260/584 |
| 3,165,477 | 1/1965 | Crowe et al. | 252/321 |
| 3,496,138 | 2/1970 | Sellers et al. | 260/47 |
| 3,531,527 | 9/1970 | Li et al. | 260/584 |
| 3,654,370 | 4/1972 | Yeakey | 260/584 B |
| 3,660,319 | 5/1972 | Yeakey | 260/2.5 AC |
| 3,696,057 | 10/1972 | Schussler et al. | 252/544 |

*Primary Examiner*—P.E. Willis, Jr.
*Attorney, Agent, or Firm*—Carl G. Ries; Thomas H. Whaley; James L. Bailey

[57] ABSTRACT

Novel defoamer and foam inhibitor compositions comprising the reaction product obtained by alkoxylating a polyoxypropylene polyamine having a molecular weight of 190-3000 and selected from the group consisting of a polyoxypropylene diamine of the formula

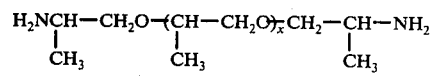

wherein $x$ is an integer of from about 1 to about 40, and a polyoxypropylene triamine of the formula

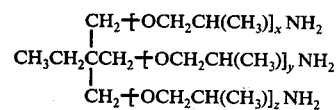

where $x$, $y$ and $z$ represent integers in the range of about 1 to 15, and the sum of $x$, $y$ and $z$ is from 3 to about 50, said alkoxylation being carried out with ethylene oxide and a higher alkylene oxide of three carbons or more in a manner such that said defoamer composition has a cloud point of 10–60° C. Said defoamer compositions are particularly useful as a minor portion of a dishwater detergent, and can be used in defoaming and inhibiting foam formation and in diverse types of normally foamable systems, particularly aqueous systems.

18 Claims, No Drawings

POLYOXYPROPYLENE POLYAMINE DERIVATIVES AS DEFOAMERS

BACKGROUND OF THE INVENTION

1. Field of the Invention

This invention relates to a specific class of alkoxylated amines compositions useful in defoaming and inhibiting foam formation in systems of many types, and preferably in normally aqueous systems.

2. Description of the Prior Art

Alkoxylated amino compounds such as those formed by alkoxylating mono- and polyamines of various structures are well known. Materials of this type are useful as surface active agents, as defoamers, as emulsion breakers, particularly petroleum emulsion breakers, etc. Particular reference may be made to U.S. Pat. Nos. 3,036,118; 3,117,997; 3,117,999; 2,792,369; 3,118,000; and 2,979,528.

However, in order to synthesize an alkoxylated amine for a particular end-use, such as a foam inhibitor or defoamer, it is necessary that the chemical structure be carefully tailored in a chemical sense so that the desired activity is obtained. It is important that both the basic structure of the molecule such as amine initiator, and alkylene oxide or mixture of alkylene oxide reagents be carefully chosen to achieve a final molecule of requisite activity. Thus, for example, depending upon its structure, and/or process of making, a particular alkoxylated amine may act in one case as a foam generator and in another situation as a foam suppressant.

It therefore becomes an object of the invention to provide a new class of compositions useful in inhibiting foam formation and/or collapsing already foamed systems. A more specific object of the invention is to provide a defoamer composition useful in inhibiting or defoaming foam formation in aqueous systems, and particularly in dishwater containing detergents used for washing. Other objects will appear hereinafter.

SUMMARY OF THE INVENTION

Accordingly, the present invention is a novel composition useful as a defoamer and foam inhibitor comprising the reaction product obtained by alkoxylating a polyoxypropylene polyamine having a molecular weight of 190-3000 and selected from the group consisting of a polyoxypropylene diamine of the formula:

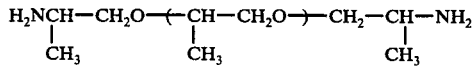

wherein $x$ is an integer of from about 1 to 40, and a polyoxypropylene triamine of the formula:

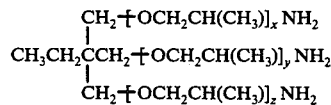

where $x$, $y$ and $z$ represent integers in the range of about 1 to 15, and the sum of $x$, $y$ and $z$ is from 3 to about 50, said alkoxylation being carried out with ethylene oxide and a higher alkylene oxide of three carbons or more in a manner such that said defoamer composition has a cloud point of 10°-60° C.

DETAILED DESCRIPTION OF THE INVENTION

The compositions here useful as defoamers and foam inhibitors consist of the reaction product of a polyoxypropylene polyamine having a molecular weight of 190-3000 and alkylene oxide. The alkoxylation of the polyoxypropylene polyamine should be carried out by a combination treatment with ethylene oxide and a higher alkylene oxide of three carbons or more in a manner such that the resultant defoamer composition has a cloud point of 10-60° C. It has been found that compounds of this type are excellent defoamers whereas those alkoxylated polyoxypropylene polyamine compositions having a cloud point substantially without said range have measurably decreased activity in this area.

The polyoxypropylene polyamine reactants are known materials, and are disclosed along with their mode of preparation in, for example, U.S. Pat. Nos. 3,654,370; 3,660,319; and 3,832,402.

Preferably, we employ as initiators for the alkylene oxides polyoxypropylene diamines of the formula:

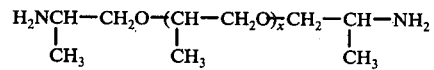

wherein $x$ is an integer of from about 1 to 40, and polyoxypropylene triamines of the formula:

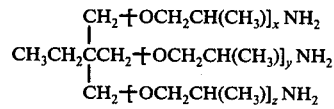

where $x$, $y$ and $z$ represents integers in the range of about 1 to 15, and the sum of $x$, $y$ and $z$ is from 3 to about 50. The preferred polyoxypropylene diamines of the formula have average molecular weights between about 190, where $x$ is an average of 1.0 to about 2,000 where $x$ is an average of about 32.2. Preferred polyoxypropylene triamines of the above formula have average molecular weights between about 200 to about 3,000. These polyoxypropylene di- and triamines are readily available commercially in a wide variety of molecular weight ranges, such as those sold by Jefferson Chemical Company, Inc., Houston, Tx., under the trademark JEFFAMINE ®.

The above polyamines are reacted with ethylene oxide and a higher alkylene oxide in a manner that is such that the final defoamer composition has the desired cloud point. The alkoxylation or series of alkoxylations can be carried out in the usual manner. The polyamine which can be here considered the initiator is reacted with the alkylene oxide or alkylene oxides using techniques known to those skilled in the art. As an example, see U.S. Pat. Nos. 2,948,757 and 3,000,963. The alkoxylation reaction itself is usually carried out in the presence of either acidic or alkaline catalysts with the latter being preferred. Examples of typical acidic catalysts include sulfuric acid, phosphoric acid and Lewis acids such as stannic chloride and boron trifluoride. Typical alkaline catalysts include tertiary amines, sodium hydroxide, potassium hydroxide, quaternary ammonium hydroxides, sodium carbonate, potassium carbonate, sodium methoxide, calcium hydroxide and barium hydroxide. Especially preferred catalysts are sodium hydroxide and potassium hydroxide.

The alkoxylation reaction may also be carried out over a wide temperature range, say within 50° to 200° C. If the alkylene oxide is a gas such as ethylene oxide and propylene oxide at the above temperature, the reaction is preferably conducted in a closed vessel under pressure. The particular pressure employed is not critical and autogenous pressures are generally used.

In addition to ethylene oxide, the polyamine is also simultaneously or sequentially reacted with a higher alkylene oxide, that is, one containing three carbons or more. Preferred among these is propylene oxide. In addition to propylene oxide, preferred higher alkylene oxides are those containing 3-18 carbon atoms. Illustrative higher alkylene oxide include the following:

Isobutylene oxide, 1,2-epoxybutane, 2,3-epoxybutane, 2,3-dimethyl-2,3-epoxybutane, 2-methyl-2,3-epoxypentane, 1,2-epoxyheptane, 5-methyl-1,2-epoxyhexane, 3,4-epoxyheptane, styrene epoxide, 1-cyclohexylepoxyethane, 2-methyl-1,2-epoxyheptane, 1,2-epoxyoctane, 2,4,4-trimethyl-1,2-epoxypentane, 2,4,4-trimethyl-2,3-epoxypentane, 1-phenyl-1,2-epoxypropane, 2-phenyl-1,2-epoxypropane, 1,2-epoxynonane, 1-phenyl-2-methyl-1,2-epoxypropane, 1-phenyl-1,2-epoxybutane, 4-phenyl-1,2-epoxybutane, 5-phenyl-1,2-epoxypentane, 1,2-epoxydecane, 1(p-tolyl)-1-methyl-3-phenyl-2,3-epoxybutane, 1-phenyl-2-ethyl-1,2-epoxybutane, 1-phenyl-2-methyl-1,2-epoxypentane, 1,2-epoxydodecane, 3-ethoxy-4-propyl-3,4-epoxy-heptane, 1,1-diphenyl-1,2-epoxypropane, 1,2-diphenyl-1,2-epoxypropane, 1,3-diphenyl-1,2-epoxypropane, 1-phenyl-2-(p-tolyl)-epoxyethane, 1-phenyl-1-(m-methoxyphenyl)-epoxyethane, 1-phenyl-1-(o-methoxyphenyl)-epoxyethane, 1'1-diphenyl-2-methyl-1,2-epoxypropane, 2,3-diphenyl-2,3-epoxybutane, 1,1-diphenyl-1,2-epoxybutane, 1,1-di(p-tolyl)-epoxyethane, 1,3-diphenyl-2-methyl-1,2-epoxypropane, 1-phenyl-2-benzyl-1,2-epoxypentane, 1-phenyl-2-benzyl-3-methyl-1,2-epoxybutane, 1,2-epoxyoctadecane, 9,10-epoxyoctadecane, and epichlorohydrin, etc.

Any sequence of addition of alkylene oxide to polyamine initiator may be carried out as long as the final alkoxylated product has a cloud point falling within the 10°–60° C. range. However, a greatly preferred procedure involves first alkoxylating the polyamine with ethylene oxide or a mixture of ethylene oxide and a higher alkylene oxide (defined as an alkylene oxide containing 3 or more carbon atoms, most preferably 3-18). If a mixture of ethylene oxide and higher alkylene oxide is employed, it is necessary that the ethylene oxide content predominate in the mixture. This first alkoxylation is then followed by a final alkoxylation with a higher alkylene oxide or a mixture of ethylene oxide and higher alkylene oxide. In this instance when a mixture of alkylene oxide is used, the higher alkylene oxide should predominate over the ethylene oxide. One may also repeat this process scheme to obtain alternating chains.

In the most preferred mode of preparing the compositions of the invention, the first alkoxylation is accomplished by reacting the polyamine with ethylene oxide or a mixture of ethylene oxide and a higher alkylene oxide wherein 60-99 weight percent of the mixture is ethylene oxide, preferably 60-90 weight percent, followed by a final alkoxylation utilizing a higher alkylene oxide or a mixture of a higher alkylene oxide and ethylene oxide wherein 60-99 weight percent of the mixture is composed of the higher alkylene oxide, preferably 60-90 weight percent. Thus, in most cases, the compositions here will have an intermediate hydrophilic chain, and be terminated by a hydrophobic chain in the relative sense, wherein a higher alkylene oxide, such as propylene oxide predominates. In other cases the composition will have a plurality of alternating ethylene oxide-rich and higher alkylene (propylene)-rich chains, terminating with the letter.

The products of the invention may be used to defoam, and control foams of a great number of systems under foaming attack. They are particularly adaptable for use in aqueous systems. Thus, the compositions may be used in the following: the feed water of boilers such as wayside boilers; for use in non-frothing emulsions used in leather tanning; in the textile industry; for incorporation into dye baths, dye pastes, discharge pastes and the like; to prevent foaming and resultant loss of liquid from a circulating cooling system; in fermentation processes; in single or multiple-effect concentrators containing aqueous, organic or inorganic type materials and the like; in controlling foaming of latex emulsions used for paints or coatings; in inhibiting and controlling foam in pulp and paper manufacture; in inhibiting foam normally occurring during preparation and concentration of natural or synthetic rubber latexes, etc.

A greatly preferred use of the compositions here involves the area of machine dishwashing. The compositions here may be used in both commercial and home machines, and can be used as part of a formulation of an alkaline inorganic detergent system which may optionally also contain amounts of well-known anionic, cationic, nonionic or amphoteric organic detergents such as alkyl aryl sulfonates, alkyl sulfonates, alkanol amides or alkyl aryl polyethers or mixtures thereof. The alkaline inorganic detergent systems comprise various combinations of inorganic sodium and potassium salts, such as polyphosphates, silicates, carbonates, and basic materials such as sodium and potassium hydroxides. While the inorganic materials do not foam themselves, at higher food soil concentrations, above say about 0.05-0.1 percent, foaming becomes a problem. The inorganic detergent systems, being alkaline, cause some saponification of fatty food soils. This, plus the natural foaming properties of protein food soils, tends to produce foam in a wash tank. This foam causes overflow and loss of the wash solution, impairs the mechanical operation of the machine, and lowers the pressure at which the washing fluid is impelled against the utensils to be cleaned.

As just noted, a greatly preferred use of the anti-foam compositions here is with an alkaline inorganic detergent system which optionally may contain many of the just-mentioned well-known organic detergents or others. When present in such a dishwasher detergent, the antifoamer of the invention will be present in an amount ranging from about 0.5 percent up to about 15 percent by weight of the total formulation, and more often is present in an amount of 1-10 percent by weight.

The anti-foam compositions here are effective in as low a concentration as a few parts per million based on the weight of the system under control. In some situations, the amount of anti-foamer present based upon total weight of the system under foam attack may range as high as 1 percent.

In more detail, with respect to the preferred use of the compositions here in detergents and particularly in conventional machine dishwashing detergent systems, these systems as originally formulated were dry, inorganic systems and consisted entirely of mixtures of alkaline salts. The detergent system is required to perform three essential functions: (1) soften the water so that the dispersive action can take place more effectively; (2) remove the soil from the dishes thoroughly, completely and rapidly; and (3) leave the dish surface in a state where the water drains in a continuous film without breaking into little hanging drops or streams. Many of the alkaline salts act as both water softeners and soil removers but will be discussed on the basis of their primary function.

Sodium carbonate, although it is among the least effective water-softening agents, together with its sesquicarbonate, is almost universally used as a component in dishwashing compounds, because of its low cost. Thus, detergent compositions of this type can contain from 0–99 percent by weight sodium or potassium carbonate.

The best and most efficient water-softening ingredients are the condensed polyphosphates, including the tripolyphosphates and the pyrophosphates. The detergent compositions can then contain from 0–70 percent by weight sodium or potassium polyphosphates. Other sequestering agents, including organic materials such as ethylenediamine-tetraacetic acid and sodium gluconate, can also be employed in compositions of this type, particularly in formulations for dairy use containing high percentages of caustic.

Polyphosphates have been shown to promote corrosion of certain metal parts of dishwashing machines but this corrosive effect can be overcome by including a relatively large proportion of a silicate in the composition. In this connection, metasilicate is important, not only from the standpoint of the machine itself, but also from the standpoint of the utensils washed. For instance, regardless of whether polyphosphate is present in a solution or not, highly alkaline dishwashing detergents containing no silicates can attack, etch, and darken aluminum utensils. Some of these formulations also have a destructive action on the over-the-glaze dish patterns. Suitable proportions of silicates in the formulation help overcome these difficulties.

The soil-removing ingredients commonly employed in dishwashing compounds include borates and carbonates, which are relatively ineffective, and orthophosphates and metasilicates, both of which are highly effective. The detergent compositions then can include 0–70 percent by weight of trisodium or tripotassium phosphate and 0–50 percent by weight of sodium or potassium meta-silicate.

More recently as discussed above small amounts of synthetic organic surfactants or wetting agents have been incorporated into machine dishwashing formulations to promote smooth drainage drying, i.e., to prevent waterbreak. Some formulations include from 1 percent to 5 percent or more of a low foaming polyethoxy type nonionic surfactant. The detergent dishwater compositions can then include 0–50 percent by weight of such synthetic, organic, low foaming, surfactants such as polyethoxy type nonionic surfactants.

Conventional machine dishwashing compositions employed for glass and bottle washing normally contain caustic soda as the major cleaning ingredient. Alkalies tend to attack glass surfaces but this can be inhibited by zincates, beryllates, or aluminates. As stated above, sodium gluconate and ethylenediaminetetraacetic acid can be used as sequestering agents for high caustic content solutions. The detergent compositions can thus include 0–99 percent sodium or potassium hydroxide.

Hence the conventional detergent systems into which the defoamers of the invention can be incorporated contain as the principal detersive agent widely varying proportions of sodium or potassium polyphosphates, i.e., 0–70 percent, sodium or potassium silicates, i.e., 0–50 percent, sodium or potassium carbonates, i.e., 0–100 percent and trisodium or tripotassium phosphate, i.e., 0–70 percent. The amount of the polyoxyalkylene adduct of the polyamine initiator then ordinarily constitutes about 0.5 to 15 percent by weight of the final detergent composition, and more often is 1–10 percent.

The following examples illustrate preparation of typical compositions of the invention useful as defoamers. These examples are meant to be illustrative only and the invention is not to be limited thereto.

EXAMPLE I

To 6 grams of a polyoxypropylene diamine falling within the above defined structure, and having a molecular weight of 230 (0.845 mole) was added 171 ml. of ethylene oxide (4 equivalents) at 130° C. The resultant product contained 4.91 meq/g total amine, and 4.89 meq/g tertiary amine.

Fifty grams of the 4 mole ethylene oxide adduct of the polyoxypropylene polyamine were reacted sequentially with 102 ml. of ethylene oxide at 110° C. and 375 ml. of propylene oxide at 110° C. in the presence of 1.5 grams potassium hydroxide. The catalyst was then neutralized with oxalic acid and the product filtered. The product, a typical defoamer of the invention, had a molecular weight of 3700 as measured by its hydroxyl number and amine number, and a 10 percent cloud point of 27.4° C.

EXAMPLE II

Here the procedure of Example I was followed with the exception that a polyoxypropylene diamine of a molecular weight of 400 was utilized as an initiator. The final polyol had an average molecular weight of 3400 and 10 percent cloud point of 36.5° C.

EXAMPLE III

In a similar manner to the above examples, a polyoxypropylene diamine of molecular weight 400 was converted to a polyol of molecular weight 3900 and a 10 percent cloud point of 26.6° C.

Here defoaming effectiveness of the above products was tested as follows:

Defoaming effectiveness was measured under conditions simulating a mechanical dishwasher. Into a cylindrical vessel, 65 × 150mm with a gas sparger at the bottom, was placed 100 ml. of a solution containing 0.15 percent milk and egg powder ("Flavor Form Protein", American Dietary Laboratory) and 0.10 percent builder. The builder was a 3:2:1 blend of sodium tripolyphosphate:sodium metasilicate: sodium carbonate. The solution was maintained at 50° as compressed air was passed through the sparger into the solution. One ml. increments of a 1 percent solution of the test surfactant were added, and the foam height generated by the flow of air was measured after each increment.

| Table of Defoaming Tests | | |
|---|---|---|
| Sample | Ml. Of 1% Solution Added To Foam | Foam Height, mm. |
| Example I | 1 | 70 |
|  | 2 | 57 |
| Example II | 1 | > 150 |
|  | 2 | > 150 |
|  | 3 | 90 |
|  | 4 | 75 |
| Example III | 1 | > 150 |
|  | 2 | 75 |
|  | 3 | 65 |
| Pluronic ®25R2 | 1 | > 150 |
|  | 2 | > 150 |
|  | 3 | > 150 |
|  | 4 | 130 |

As can be seen from the above results, the defoamers of the invention are superior to a typical commercial defoamer.

We claim:

1. A composition useful as a defoamer and foam inhibitor consisting essentially of the reaction product obtained by alkoxylating a polyoxypropylene polyamine having a molecular weight of 190-3000 and selected from the group consisting of a polyoxypropylene diamine of the formula:

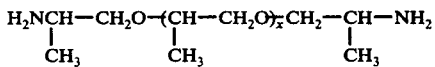

wherein $x$ is an integer of from about 1 to 40, and a polyoxypropylene triamine of the formula:

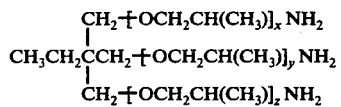

where $x$, $y$ and $z$ represent integers in the range of about 1 to 15, and the sum of $x$, $y$ and $z$ is from 3 to about 50, said alkoxylation being carried out with ethylene oxide and a higher alkylene oxide of three carbons or more in a manner such that said defoamer composition has a cloud point of 10°-60° by first alkoxylating said polyoxypropylene polyamine with ethylene oxide or a mixture of ethylene oxide and said higher alkylene oxide wherein said ethylene oxide predominates in said mixture, and effecting a final alkoxylation with said higher alkylene oxide or a mixture of ethylene oxide and said higher alkylene oxide wherein said higher alkylene oxide predominates.

2. The composition of claim 1 wherein said higher alkylene oxide is propylene oxide.

3. The composition of claim 1 wherein said alkoxylation is carried out by first ethoxylating said polyoxypropylene polyamine followed by a final alkoxylation with said higher alkylene oxide.

4. The composition of claim 3 wherein said higher alkylene oxide is propylene oxide.

5. The composition of claim 1 wherein said alkoxylation is carried out by first ethoxylating said polyoxypropylene polyamine followed by a final alkoxylation with a mixture of said higher alkylene oxide and ethylene oxide.

6. The composition of claim 5 wherein said higher alkylene oxide is propylene oxide.

7. The composition of claim 1 wherein said alkoxylation is carried out by first alkoxylating said polyoxypropylene polyamine with a mixture of ethylene oxide and said higher alkylene oxide followed by a final alkoxylation with said higher alkylene oxide.

8. The composition of claim 1 wherein said alkoxylation is carried out by first alkoxylating said polyoxypropylene polyamine with a mixture of ethylene oxide and said higher alkylene oxide followed by a final alkoxylation with a mixture of said higher alkylene oxide and ethylene oxide.

9. The composition of claim 7 wherein said higher alkylene oxide is propylene oxide.

10. The composition of claim 8 wherein said higher alkylene oxide is propylene oxide.

11. The composition of claim 1 wherein said alkoxylation is carried out by first alkoxylating said polyoxypropylene polyamine with ethylene oxide or a mixture of ethylene oxide and said higher alkylene oxide wherein 60-99% of said mixture is comprised of ethylene oxide, and effecting a final alkoxylation with said higher alkylene oxide or a mixture of ethylene oxide and said higher alkylene oxide wherein 60-99% said mixture is said higher alkylene oxide.

12. The composition of claim 11 wherein said higher alkylene oxide is propylene oxide.

13. The process of defoaming and inhibiting foam formation in a system which normally tends to be foamable which comprises incorporating in said system the composition of claim 1.

14. The process of claim 13 wherein said system is an aqueous system.

15. The process of claim 14 wherein said system is a dishwasher detergent.

16. A detergent composition comprising an alkaline inorganic detergent and a synthetic organic detergent selected from the group consisting of an alkyl aryl sulfonate, an alkyl sulfonate, an alkanol amide, an alkyl aryl polyether and mixtures thereof having also incorporated therein in a minor amount the composition of claim 1.

17. The composition of claim 16 wherein the composition of claim 1 is present in an amount of 0.5-15% by weight based on the total detergent composition weight.

18. A detergent composition comprising an alkaline inorganic detergent and the composition of claim 1.

* * * * *